United States Patent
Al Rawi et al.

(10) Patent No.: US 12,470,269 B2
(45) Date of Patent: Nov. 11, 2025

(54) MIMO SYSTEMS

(71) Applicant: BRITISH TELECOMMUNICATIONS PUBLIC LIMITED COMPANY, London (GB)

(72) Inventors: Anas Al Rawi, London (GB); Arman Shojaeifard, London (GB); Trevor Linney, London (GB)

(73) Assignee: British Telecommunications Public Limited Company, London (GB)

( * ) Notice: Subject to any disclaimer, the term of this patent is extended or adjusted under 35 U.S.C. 154(b) by 21 days.

(21) Appl. No.: 18/256,071

(22) PCT Filed: Dec. 1, 2021

(86) PCT No.: PCT/EP2021/083786
§ 371 (c)(1),
(2) Date: Jun. 6, 2023

(87) PCT Pub. No.: WO2022/122508
PCT Pub. Date: Jun. 16, 2022

(65) Prior Publication Data
US 2024/0039589 A1    Feb. 1, 2024

(30) Foreign Application Priority Data
Dec. 7, 2020 (GB) .................................. 2019226

(51) Int. Cl.
*H04B 7/0456* (2017.01)
*H04B 7/06* (2006.01)

(52) U.S. Cl.
CPC ......... *H04B 7/0486* (2013.01); *H04B 7/0626* (2013.01)

(58) Field of Classification Search
CPC ........................... H04B 7/0486; H04B 7/0626
See application file for complete search history.

(56) References Cited

U.S. PATENT DOCUMENTS

| | | | |
|---|---|---|---|
| 6,259,746 B1 | 7/2001 | Levin et al. | |
| 7,817,745 B2 * | 10/2010 | Cioffi | H04L 25/03343 375/267 |

(Continued)

FOREIGN PATENT DOCUMENTS

| | | |
|---|---|---|
| CN | 101218776 A | 7/2008 |
| CN | 103532593 A | 1/2014 |

(Continued)

OTHER PUBLICATIONS

Combined Search and Examination Report under Sections 17 and 18(3) for Great Britain Application No. 2101202.6, mailed on Oct. 25, 2021, 9 pages.

(Continued)

Primary Examiner — Janice N Tieu
(74) Attorney, Agent, or Firm — EIP US LLP

(57) ABSTRACT

A method of processing a plurality of multiple-input multiple-output (MIMO) signals for transmission over a plurality of communication channels can include precoding the plurality of signals prior to transmission, the precoding incorporating channel state information in relation to the plurality of communication channels, the precoding further incorporating: a priority ranking of a first channel of the plurality of communication channels relative to a second channel of the plurality of communication channels; and/or an error rate required by a channel of the plurality of communication channels; and/or an amount of noise experienced by a channel of the plurality of communication channels.

10 Claims, 3 Drawing Sheets

(56) References Cited

U.S. PATENT DOCUMENTS

| | | | |
|---|---|---|---|
| 9,270,333 B2 | 2/2016 | Lu et al. | |
| 9,584,181 B2 | 2/2017 | Strobel et al. | |
| 9,674,801 B2 | 6/2017 | Farmanbar et al. | |
| 9,800,720 B2 | 10/2017 | Lu et al. | |
| 10,069,617 B2 | 9/2018 | Al Rawi et al. | |
| 10,230,510 B2 | 3/2019 | Yogeeswaran et al. | |
| 10,511,361 B2 | 12/2019 | Chang et al. | |
| 11,838,069 B2 | 12/2023 | Stigant et al. | |
| 12,191,939 B2 | 1/2025 | Dai et al. | |
| 2003/0218973 A1 | 11/2003 | Oprea et al. | |
| 2004/0095921 A1 | 5/2004 | Kerpez | |
| 2006/0280237 A1 | 12/2006 | Rhee et al. | |
| 2008/0075058 A1* | 3/2008 | Mundarath | H04B 7/0417 370/342 |
| 2009/0046568 A1 | 2/2009 | Xu | |
| 2009/0181708 A1* | 7/2009 | Kim | H04W 72/02 455/501 |
| 2009/0323783 A1* | 12/2009 | Buris | H04B 17/21 375/260 |
| 2010/0232536 A1 | 9/2010 | Park et al. | |
| 2011/0080969 A1* | 4/2011 | Jongren | H04B 7/0469 375/267 |
| 2012/0177140 A1 | 7/2012 | Sahara | |
| 2013/0208579 A1 | 8/2013 | Strobel et al. | |
| 2014/0010322 A1* | 1/2014 | Oyman | H04L 1/0019 375/267 |
| 2014/0119536 A1 | 5/2014 | Strobel et al. | |
| 2014/0359389 A1 | 12/2014 | Seastrom et al. | |
| 2015/0295621 A1 | 10/2015 | Wang | |
| 2016/0170437 A1 | 6/2016 | Aweya | |
| 2016/0295014 A1 | 10/2016 | Wei | |
| 2016/0380673 A1 | 12/2016 | Pal et al. | |
| 2018/0077540 A1* | 3/2018 | Choi | H04B 7/0413 |
| 2020/0028972 A1 | 1/2020 | Al Rawi et al. | |
| 2020/0228177 A1 | 7/2020 | Mittal et al. | |
| 2020/0274604 A1* | 8/2020 | Sun | H04B 7/0665 |
| 2020/0343960 A1* | 10/2020 | Li | H04L 1/1614 |
| 2021/0194539 A1 | 6/2021 | Bastos Moraes et al. | |
| 2021/0288661 A1 | 9/2021 | Nuzman | |
| 2024/0072853 A1 | 2/2024 | Lord et al. | |
| 2024/0305340 A1 | 9/2024 | Al Rawi et al. | |

FOREIGN PATENT DOCUMENTS

| | | |
|---|---|---|
| CN | 103795439 A | 5/2014 |
| CN | 103891154 A | 6/2014 |
| CN | 103532593 B | 6/2016 |
| EP | 2091196 A1 | 8/2009 |
| EP | 14250116 | 9/2014 |
| EP | 2819313 A1 | 12/2014 |
| EP | 3154205 A1 | 4/2017 |
| EP | 3154205 B1 | 7/2018 |
| EP | 2819313 B1 | 11/2019 |
| GB | 2569991 B | 8/2020 |
| WO | WO-2006120510 A1 | 11/2006 |
| WO | WO-2008030150 A1 | 3/2008 |
| WO | WO-2013026479 A1 | 2/2013 |
| WO | WO-2016139254 A1 | 9/2016 |
| WO | WO-2017129227 A1 | 8/2017 |
| WO | WO-2017195183 A1 | 11/2017 |
| WO | WO-2018004855 A1 | 1/2018 |
| WO | WO-2018128895 A1 | 7/2018 |
| WO | WO-2019134911 A1 | 7/2019 |

OTHER PUBLICATIONS

Combined Search and Examination Report under Sections 17 and 18(3) for Great Britain Application No. GB2019226.6, mailed on Apr. 23, 2021, 9 pages.
Communication pursuant to Article 94(3) EPC for European Application No. 16707747.8, mailed on Apr. 15, 2019, 13 pages.
Extended European Search Report for Application No. 18150608.0, mailed on May 3, 2018, 10 pages.
Extended European Search Report for European Application No. 15275057.6, mailed on Jun. 2, 2015, 10 pages.
Final Office Action for U.S. Appl. No. 15/733,353, mailed on Jul. 20, 2022, 25 pages.
First Notification of Office Action and Search Report for Chinese Application No. 201680013357.0, mailed on Aug. 10, 2020, 11 pages.
International Search Report and Written Opinion for Application No. PCT/EP2019/050031, mailed on Jan. 30, 2019, 11 pages.
International Search Report and Written Opinion for Application No. PCT/EP2021/083786, mailed on May 13, 2022, 16 pages.
International Search Report and Written Opinion for International Application No. PCT/EP2016/054441, mailed Apr. 21, 2016, 12 pages.
International Search Report and Written Opinion for International Application No. PCT/EP2021/087646, mailed Mar. 25, 2022, 12 pages.
International Search Report for International Application No. PCT/EP2016/054441, mailed Apr. 21, 2016, 3 pages.
International Telecommunication Union: "Series G: Transmission Systems and Media, Digital Systems and Networks, Digital Sections and Digital Line System—Access Networks," Self-FEXT Cancellation Vectoring} for Use with Vdsl2 Transceivers, XP008153737, ITU-T G.993.5, Apr. 2010, 80 pages.
Non-Final Office Action for U.S. Appl. No. 15/733,353, mailed on Mar. 29, 2022, 19 pages.
Office Action For Chinese Application No. 201980007444.9, mailed on May 6, 2021, 12 pages.
Office Action For GB Application No. 1800253.5, mailed on Jun. 1, 2020, 2 pages. .
Office Action For GB Application No. 1800253.5, mailed on Jun. 27, 2018, 5 pages.
Partial Search Report for International Application No. PCT/EP2021/083786, mailed on Mar. 22, 2022, 13 pages.
Stigant L., et al., "Spatially Adaptive Linear Precoding for Systems Beyond G. fast," 2018, 6 pages.
Written Opinion for International Application No. PCT/EP2016/054441, mailed Apr. 21, 2016, 9 pages.
"Communication pursuant to Article 94(3) EPC for Application No. 19700013.6, mailed on Apr. 30, 2021", 6 pages.
"International Preliminary Report on Patentability for Application No. PCT/EP2021/083786 mailed on Jun. 22, 2023", 11 pages.
"International Preliminary Report on Patentability received for PCT Patent Application No. PCT/EP2021/087646, mailed on Aug. 10, 2023", 7 pages.

* cited by examiner

MIMO SYSTEMS

PRIORITY CLAIM

The present application is a National Phase entry of PCT Application No. PCT/EP2021/083786, filed Dec. 1, 2021, which claims priority from GB Patent Application No. 2019226.6, filed Dec. 7, 2020, each of which is hereby fully incorporated herein by reference.

BACKGROUND MIMO (Multiple-Input-Multiple-Output) is a type of radio communication that exploits multipath propagation to increase the capacity and/or performance of the network. It is a mature subject in both industry and academia and is an essential element of various wireless communication standards.

A MIMO network could be, for example, a cellular network in which a base station has multiple antennae for communication with mobile stations within its cell. In known MIMO systems, precoding is performed on signals prior to transmission in order to improve signal quality by addressing interference (through interference cancellation and/or beamforming).

Although the use of MIMO provides increased capacity and/or performance, it has certain problems. In particular, providing a high signal to noise ratio is challenging, due to resource scarcity, as is providing a low error rate. These issues may be particularly important to some users.

SUMMARY

It is desirable to provide a method which addresses some or all of the above-mentioned and/or other disadvantages.

According to a first aspect of the disclosure there is provided a method of processing a plurality of multiple-input multiple-output (MIMO) signals for transmission over a plurality of communication channels, the method comprising: precoding the plurality of signals prior to transmission, the precoding incorporating channel state information in relation to the plurality of communication channels, the precoding further incorporating: a priority ranking of a first channel of the plurality of communication channels relative to a second channel of the plurality of communication channels; and/or an error rate required by a channel of the plurality of communication channels; and/or an amount of noise experienced by a channel of the plurality of communication channels.

An advantage of this method is that it enables resources to be diverted to channels based on their priority, bit error ratio demands and/or the amount of noise the channels are experiencing. Taking these factors into account during the precoding stage, as opposed to other stages, enables resources to be allocated more effectively.

The error rate may be a bit error rate and may be a bit error ratio. A bit error ratio is the ratio of corrupted bits to successfully received bits.

The method may be performed at a MIMO transmitter which may be located within a base station of a cellular network and/or within a mobile station of the cellular network. The method may comprise transmitting the plurality of signals over the plurality of channels to one or more receivers. The one or more receivers may be located in mobile stations and may be within the cellular network. The one or more receivers may operate as conventional MIMO receivers. Alternatively, or in addition, the receiver may be located in the base station.

The method may comprise, preliminarily, encoding the plurality of signals and/or mapping the plurality of encoded signals onto constellation points. The encoding may be performed by a symbol encoder and the mapping may be performed by a mapper.

Following precoding, the method may further comprise performing an inverse discrete Fourier transform on the plurality of signals. The plurality of signals may then be passed to an analogue front end of the transmitter and transmitted.

The method may further comprise determining a channel matrix containing the channel state information. Elements of the channel matrix may comprise the channel coefficients associated with the plurality of channels. The method may comprise determining a precoding matrix by modifying the channel matrix using an indication of the priority ranking and/or an indication of the bit error ratio and/or an indication of the amount of noise experienced by the channel of the plurality of channels. This may be performed at a single component within the transmitter. The single component may be a management component.

The method may further comprise using the precoding matrix to precode the plurality of signals to be transmitted and may comprise multiplying the signal to be transmitted by the precoding matrix. This may be performed at a precoder which may be a discrete component of the transmitter and may be separate from the management component.

Modifying the channel matrix using the indication of priority ranking may comprise re-ordering the elements of the channel matrix in accordance with the indication of the priority ranking. Modifying the channel matrix may comprise using the indication of priority ranking and may comprise reducing one or more channel coefficients associated with a highest-ranked channel or highest-ranked plurality of channels, such as to a value of zero.

Modifying the channel matrix using the indication of bit error ratio may comprise modifying one or more elements in accordance with the bit error rate required by a channel of interest. This may involve modifying one or more elements of the channel matrix associated with the channel of interest and may comprise reducing the value of the one or more elements. The one or more elements may be indicative of the interference caused to the channel of interest by one or more of the other channels. Modifying the one or more elements may comprise multiplying the one or more elements with a gap function associated with the channel of interest. The gap function may be defined as:

$$\Gamma = \frac{-\ln 5 * ber}{1.5}(2^q - 1)$$

where ber is the bit error rate required by the channel of interest and q is the lowest QAM modulation order.

Modifying the channel matrix using the indication of noise may comprise modifying one or more elements in accordance with the noise experienced by a channel of interest. This may involve modifying one or more elements of the channel matrix associated with the channel of interest and may comprise reducing the value of the one or more elements. The one or more elements may be indicative of the interference caused to the channel of interest by one or more of the other channels.

Determining a channel matrix containing the channel state information may comprise transmitting training signals into each channel and measuring the return signals. This may be performed at a discrete component of the transmitter which may be a channel state information component.

The method may further comprise receiving information relating to the indication of priority ranking and/or the indication of bit error ratio and/or the indication of noise. This information may be received at a service information component and may be received from one or more users of the plurality of channels. The service information component may be a discrete component within the transmitter. The method may further comprise using this received information to determine the indication of priority ranking and/or the indication of bit error ratio and/or the indication of noise.

The precoding may comprise channel multiplexing and/or beamforming.

According to a second aspect of the disclosure there is provided a system for processing a plurality of multiple-input multiple-output (MIMO) signals for transmission over a plurality of communication channels, the system comprising: a precoder adapted to precode the plurality of signals prior to transmission, the precoding incorporating channel state information in relation to the plurality of communication channels, the precoding further incorporating: a priority ranking of a first channel of the plurality of communication channels relative to a second channel of the plurality of communication channels; and/or an error rate required by a channel of the plurality of communication channels; and/or an amount of noise experienced by a channel of the plurality of communication channels.

The precoder may be adapted to receive channel state information in relation to the plurality of communication channels from the channel state information component.

The system may further comprise a management unit adapted to provide precoding information to the precoder, the precoding information incorporating the channel state information and/or the indication of a priority ranking and/or the indication of a bit error ratio and/or the indication of noise. The management unit may be adapted to receive the channel state information from the channel state information component. The management unit may be adapted to receive the indication of a priority ranking and/or the indication of a bit error ratio and/or the indication of noise from the service information component.

BRIEF DESCRIPTION OF THE DRAWINGS

Embodiments of the disclosure will now be described, for illustration only, and with reference to the enclosed drawings, in which.

DETAILED DESCRIPTION

Figure 1:
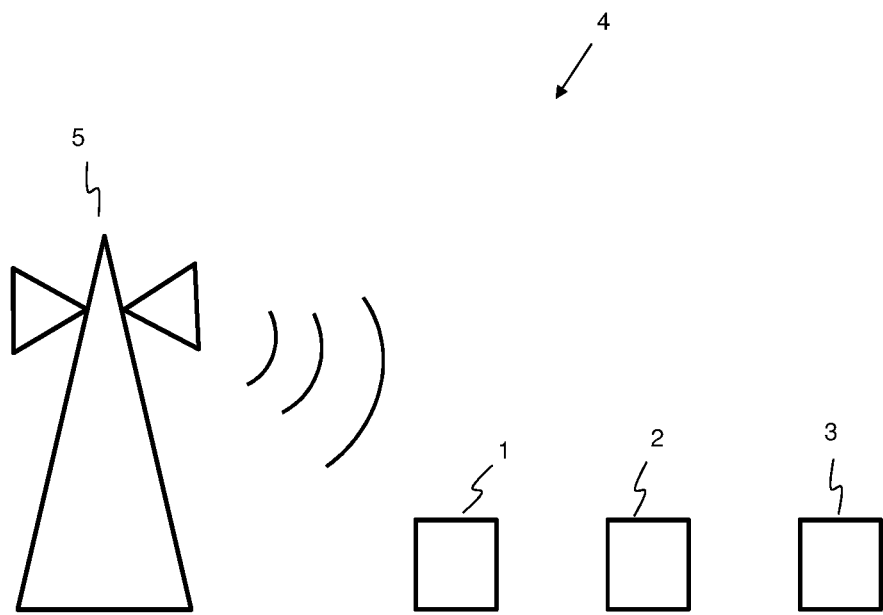
FIG. 1 is a schematic view of a network in accordance with the disclosure.

FIG. 1 shows a cellular network in accordance with the disclosure. The network is shown generally at 4. In particular there is a cellular base station 5 and mobile stations 1, 2 and 3. Mobile stations 1, 2 and 3 are located within the cell of the base station 5 and communicate with base station 5.

Figure 2:
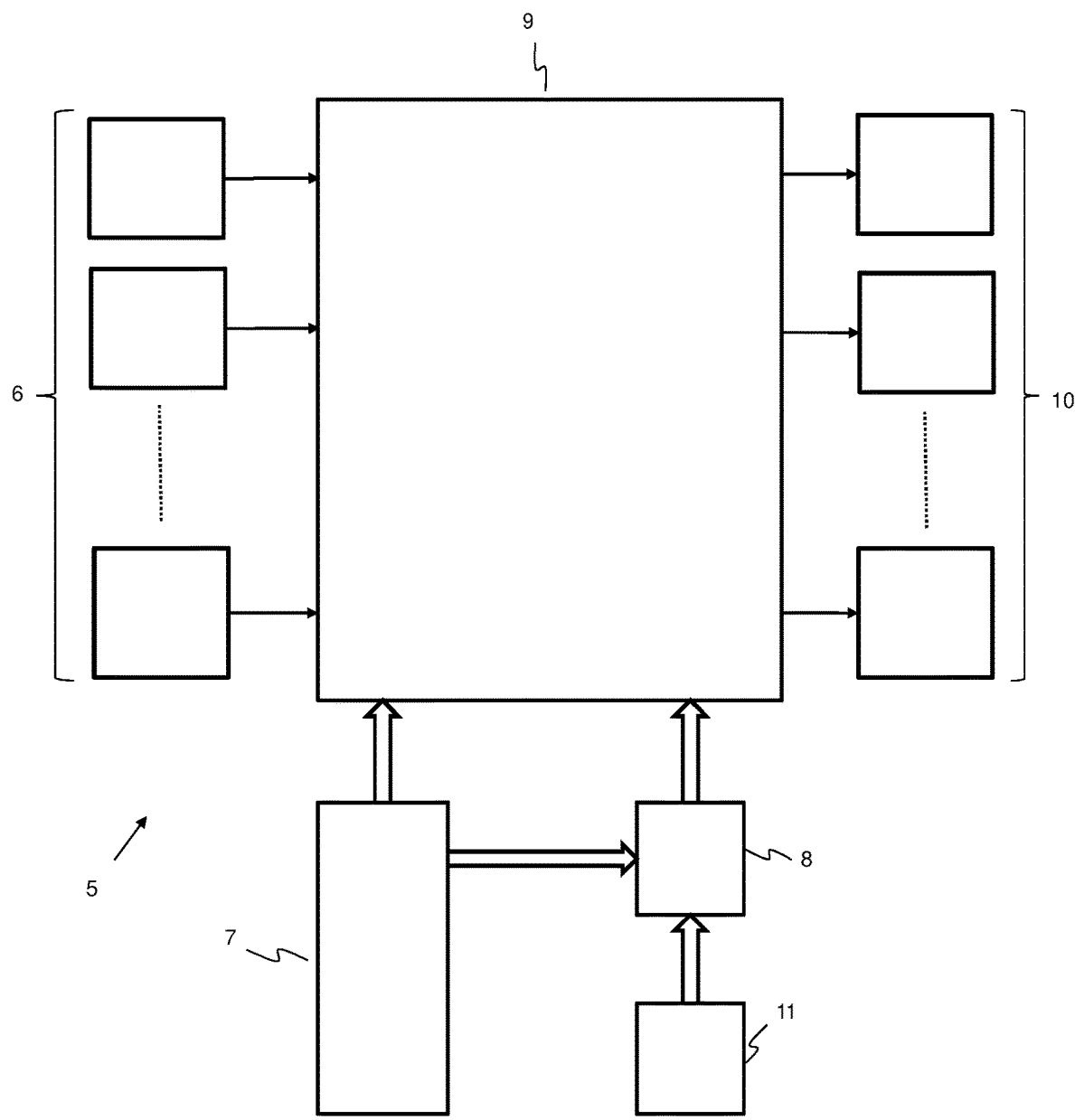
FIG. 2 is a schematic view of a transmitter adapted to perform a method in accordance with the disclosure.

FIG. 2 shows a MIMO transmitter 5 in accordance with the disclosure. The transmitter 5 is located within base station 5 of FIG. 1. The transmitter 5 comprises an array of N symbol encoders and mappers 6. Three components of the array are shown for illustration. The symbol encoders encode users' bit stream data using a given coding scheme e.g. convolutional, LDPC or turbo. This is done to combat errors arising from the background noise of the channel. The mappers map subsets of the encoded data into constellation points with distinct phase and amplitude. The length of the subsets is determined via the modulation order and can be optimized via bit loading.

The transmitter 5 comprises a MIMO channel entity 7. The MIMO channel entity 7 performs a channel estimation. It does so by transmitting training signals (not shown) on the channels and measuring the effect the channel has on the training signals. From this a channel matrix H is determined. H comprises channel coefficients. An example of H is:

$$H = \begin{bmatrix} h_{11} & h_{12} & h_{13} \\ h_{21} & h_{22} & h_{23} \\ h_{31} & h_{32} & h_{33} \end{bmatrix}$$

The elements $h_{ij}$ are channel coefficients, and are a measure of the interference experienced on channel i as a result of the signal transmitted on channel j. The MIMO channel entity 7 measures the channel coefficients, constructs channel matrix H, and sends H to a MIMO Management Unit 8.

There is also a traffic demands entity 11. This obtains a measure of the demands on the channels. For example, it obtains prioritization information that enables it to rank the different users (i.e., mobile stations 1, 2 and 3 in FIG. 1) in order of importance. An ambulance, for example, may be considered a user of high importance and given a high ranking. It also obtains information relating to the bit rate required by each user. A streaming service, for example, may require a higher bit rate than other services. This information is passed to the MIMO Management Unit 8.

The MIMO Management Unit 8 combines the prioritization and bit rate requirements obtained from the traffic demands entity 11 with the channel matrix H obtained from the MIMO channel entity 7. How this is done will now be described.

The example system has three channels. The prioritization order of the three channels is 3, 2, 1, with 3 being the most important. The prioritization can be represented as a row vector (where the operator T provides its transpose):

$[3\ 2\ 1]^T$

The MIMO Management Unit 8 constructs a binary matrix U which reflects the priority rankings. If the channels were of equal importance, U would take the form of the identity matrix I:

$$U = \begin{bmatrix} 1 & 0 & 0 \\ 0 & 1 & 0 \\ 0 & 0 & 1 \end{bmatrix}$$

However, in this example the channels have the ranking 3, 2, 1. This causes the rows U to shuffle, resulting in:

$$U = \begin{bmatrix} 0 & 0 & 1 \\ 0 & 1 & 0 \\ 1 & 0 & 0 \end{bmatrix}$$

The MIMO Management Unit 8 now uses U to modify H to reflect the channel rankings. This is done using the formula:

$$\hat{H} = U^T H U = \begin{bmatrix} h_{33} & h_{32} & h_{31} \\ h_{23} & h_{22} & h_{21} \\ h_{13} & h_{12} & h_{11} \end{bmatrix}$$

This re-orders the elements in H. Now the elements on bottom row of H relate to the effect of the channel on the signals on channel 3. The elements on the bottom row of the modified H matrix are reduced to zero:

$$\hat{H} = \begin{bmatrix} h_{33} & h_{32} & h_{31} \\ h_{23} & h_{22} & h_{21} \\ 0 & 0 & 0 \end{bmatrix}$$

Ĥ is then transmitted from the MIMO Management Unit 8 to a MIMO Precoder Unit 9. The MIMO Precoder Unit 9 uses Ĥ to determine a precoder matrix to be applied to the signal $X_N$ it receives from the Symbol Encoder and Mapper array. This is done using the following formula:

$$\hat{P} = \hat{H}^H (\hat{H}\hat{H}^H)^{-1}$$

Where $\hat{H}^H$ represents the Hermitian of Ĥ.
Incorporating Ĥ into this formula gives:

$$\hat{P} = \begin{bmatrix} h_{33}^* & h_{23}^* \\ h_{32}^* & h_{22}^* \\ h_{31}^* & h_{21}^* \end{bmatrix} \left( \begin{bmatrix} h_{33} & h_{32} & h_{31} \\ h_{23} & h_{22} & h_{21} \end{bmatrix} \begin{bmatrix} h_{33} & h_{23} \\ h_{32} & h_{22} \\ h_{31} & h_{21} \end{bmatrix} \right)^{-1} = \begin{bmatrix} p_{33}^\wedge & p_{23}^\wedge \\ p_{32}^\wedge & p_{22}^\wedge \\ p_{31}^\wedge & p_{21}^\wedge \end{bmatrix}$$

The MIMO Precoder Unit 9 then re-orders the resulting precoder matrix P̂ so that each element matches its respective antenna:

$$P = Up \begin{bmatrix} p_{33}^\wedge & p_{23}^\wedge & 0 \\ p_{32}^\wedge & p_{22}^\wedge & 0 \\ p_{31}^\wedge & p_{21}^\wedge & 0 \end{bmatrix} Up^T = \begin{bmatrix} 0 & p_{21}^\wedge & p_{31}^\wedge \\ 0 & p_{22}^\wedge & p_{32}^\wedge \\ 0 & p_{23}^\wedge & p_{33}^\wedge \end{bmatrix}$$

The resulting precoder matrix P has therefore been modified to take account of the relative priorities of the three channels. The MIMO Precoder Unit 9 then multiplies P by the signals $X_N$ it receives from the Symbol Encoder and Mapper Array 6. This results in the transmission signals $X_N'$. The signals $X_N'$ are then passed to an array of Inverse Discrete Fourier Transform components/Analogue Front End 10 and are transmitted from antennae to users 1, 2 and 3. This is conventional in MIMO systems and so will not be described in detail here. Users 1, 2 and 3 receive the signals and process them in a manner which is conventional and so will not be described in detail here.

A second embodiment will now be described which, in addition to taking user priority into account, also takes the user service requirements into account. It may be, for example, that some users require particularly high data rates. Furthermore, some users require the data to have very few errors and so require a low bit error rate (ber). A quantity known as the Gap value Γ is relevant in this context. The Gap value is defined as the minimum allowed separation between the signal and noise levels to achieve a given ber and can be expressed mathematically as:

$$\Gamma = \frac{-\ln 5 * ber}{1.5}(2^q - 1)$$

where q is the lowest QAM modulation order.

In the first embodiment described above, the MIMO Management Unit 8 modified the channel matrix H to incorporate the different user priorities, resulting in Ĥ. In the present embodiment, Ĥ is further modified, at the MIMO Management Unit 8, to incorporate the ber requirement. This is done using the further processing:

$$\overline{\hat{H}} = \begin{bmatrix} h_{22} & h_{21} & h_{23} \\ h_{12} & h_{11} & h_{13} \\ 0 & 0 & 0 \end{bmatrix} \begin{bmatrix} \Gamma_2^{-1} & 0 & 0 \\ 0 & \Gamma_1^{-1} & 0 \\ 0 & 0 & \Gamma_3^{-1} \end{bmatrix} = \begin{bmatrix} h_{22}\Gamma_2^{-1} & h_{21}\Gamma_1^{-1} & h_{23}\Gamma_3^{-1} \\ h_{12}\Gamma_2^{-1} & h_{11}\Gamma_1^{-1} & h_{13}\Gamma_3^{-1} \\ 0 & 0 & 0 \end{bmatrix}$$

In this operation, Ĥ is multiplied by a diagonal matrix containing the relevant Gap values to produce $\overline{\hat{H}}$. $\overline{\hat{H}}$ is then transmitted from the MIMO Management Unit 8 to the MIMO Precoder Unit 9 as described above in relation to the first embodiment. The MIMO Precoder Unit 9 then uses H to determine a precoder matrix to be applied to the signal $X_N$ it receives from the Symbol Encoder and Mapper array 6 in the manner described above in relation to the first embodiment.

In a third embodiment, H is further modified to lower the priority level of a user if communication with that user is significantly obstructed by, for example, noise, being a large distance from the base station, the fact that the user is moving, or there are physical obstructions between the user and the base station. This is done at the MIMO Management Unit 8 using the following:

$$\overline{\overline{\hat{H}}} = \begin{bmatrix} h_{22}(\Gamma_2 n_2)^{-1} & h_{21}(\Gamma_1 n_1)^{-1} & h_{23}(\Gamma_3 n_3)^{-1} \\ h_{12}(\Gamma_2 n_2)^{-1} & h_{11}(\Gamma_1 n_1)^{-1} & h_{13}(\Gamma_3 n_3)^{-1} \\ h_{32}(\Gamma_2 n_2)^{-1} & h_{31}(\Gamma_1 n_1)^{-1} & h_{33}(\Gamma_3 n_3)^{-1} \end{bmatrix}$$

Where $n_i$ represents the noise on the various channels. As in embodiments 1 and 2, this modified channel matrix $\overline{\overline{\hat{H}}}$ is passed to the MIMO Precoder Unit 9 and used to determine a precoder matrix to be applied to the signal $X_N$.

Figure 3:
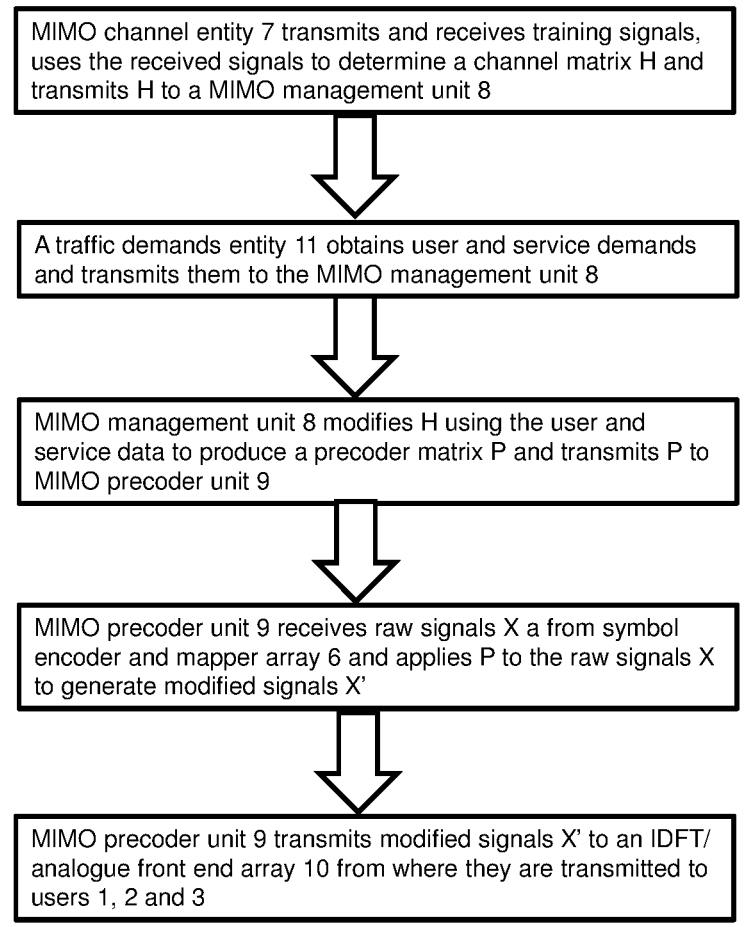
FIG. 3 is a flow chart showing a method in accordance with the disclosure.

FIG. 3 is a flow chart showing a method of the disclosure.

The invention claimed is:

1. A method of processing a plurality of multiple-input multiple-output (MIMO) signals for transmission over a plurality of communication channels, the method comprising:
   precoding the plurality of MIMO signals prior to transmission, the precoding incorporating channel state information in relation to the plurality of communication channels, the precoding further incorporating at least one of:
   a priority ranking of an importance of a first channel of the plurality of communication channels relative to an importance of a second channel of the plurality of communication channels,
   an error rate required by a channel of the plurality of communication channels, or
   an amount of noise experienced by a channel of the plurality of communication channels.

2. The method as claimed in claim 1, the method further comprising, preliminarily, encoding the plurality of MIMO signals and mapping the plurality of encoded MIMO signals onto constellation points.

3. The method as claimed in claim 1, further comprising performing an inverse discrete Fourier transform on the plurality of MIMO signals.

4. The method as claimed in claim 1, further comprising determining a channel matrix containing the channel state information where elements of the channel matrix comprise channel coefficients associated with the plurality of channels.

5. The method as claimed in claim 4, further comprising modifying the channel matrix using an indication of the priority ranking by reducing one or more channel coefficients associated with a highest-ranked channel or a highest-ranked plurality of channels to zero.

6. The method as claimed in claim 4, further comprising modifying the channel matrix using an indication of the error rate by modifying one or more elements in accordance with the bit error rate required by a channel of interest.

7. The method as claimed in claim 4, further comprising modifying the channel matrix using an indication of the amount of noise by modifying one or more elements in accordance with noise experienced by a channel of interest.

8. A non-transitory computer-readable storage medium storing a computer program comprising instructions which, when the computer program is executed by a computer, cause the computer to carry out the method of claim 1.

9. A computer system comprising at least one processor and memory configured to carryout the method of claim 1.

10. A system for processing a plurality of multiple-input multiple-output (MIMO) signals for transmission over a plurality of communication channels, the system comprising:

a precoder adapted to precode the plurality of MIMO signals prior to transmission, the precoding incorporating channel state information in relation to the plurality of communication channels, the precoding further incorporating at least one of:

a priority ranking of an importance of a first channel of the plurality of communication channels relative to an importance of a second channel of the plurality of communication channels, an error rate required by a channel of the plurality of communication channels, or an amount of noise experienced by a channel of the plurality of communication channels.

* * * * *